May 1, 1945.  B. A. GADOW  2,374,740
TENSIONAL SHINGLE FASTENER
Filed Nov. 12, 1943
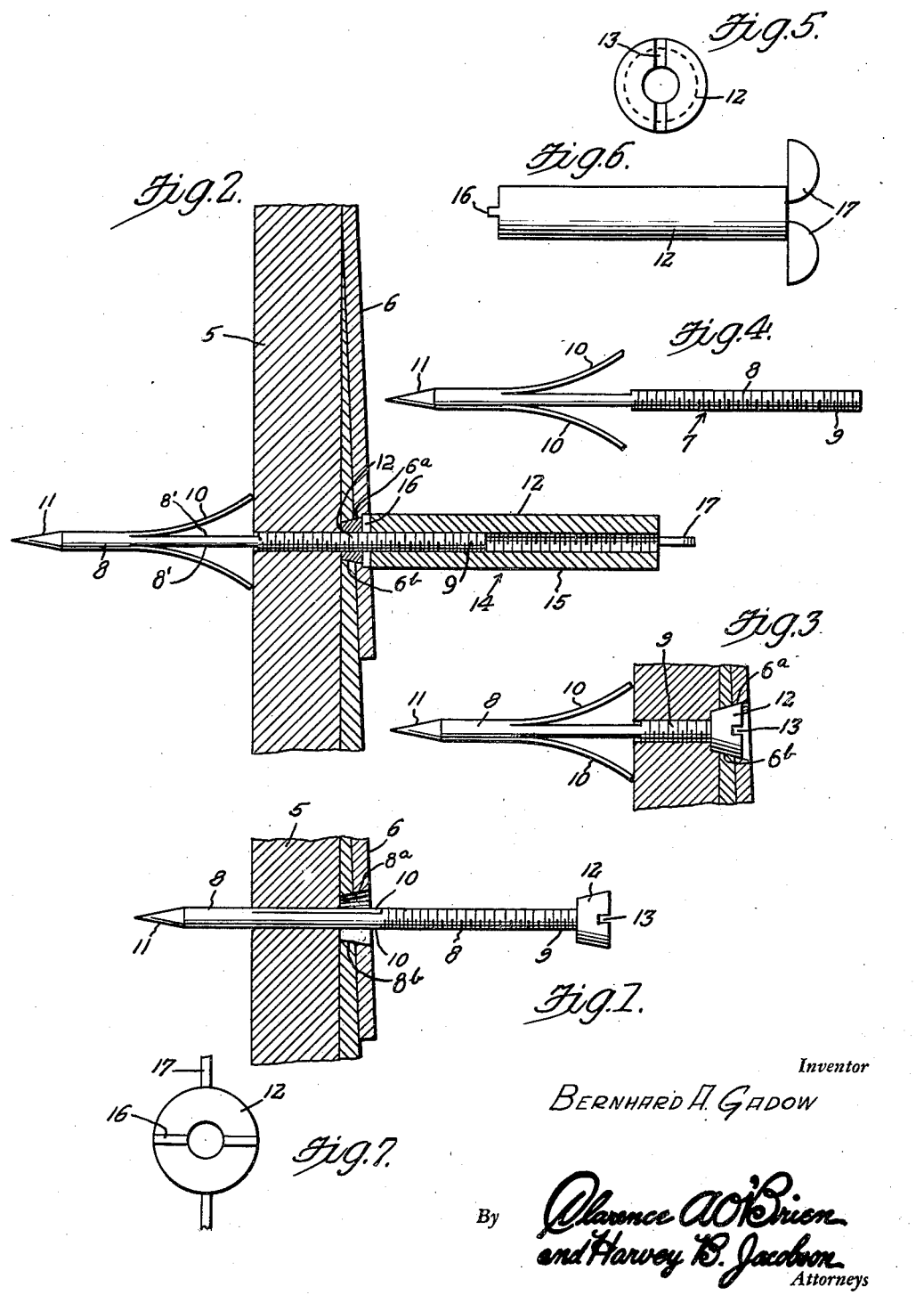
Inventor
BERNHARD A. GADOW
By Clarence A. O'Brien
and Harvey B. Jacobson
Attorneys Patented May 1, 1945

2,374,740

UNITED STATES PATENT OFFICE 2,374,740

TENSIONAL SHINGLE FASTENER

Bernhard A. Gadow, Rehoboth Beach, Del.

Application November 12, 1943, Serial No. 510,027

1 Claim. (Cl. 85—1)

This invention relates to new and useful improvements in fastening means for shingles, such as asbestos or wooden shingles which have a tendency to expand or contract in response to varying weather conditions.

The principal object of the present invention is to provide a tensional fastener which will yield corresponding to changes in expansion or contraction of shingles as a result of climatic changes.

Another important object of the invention is to provide a fastener of the character stated which can be readily applied and which in use will firmly hold shingles in place.

Other objects and advantages of the invention will become apparent to the reader of the following description.

In the drawing:

Figure 1 represents a vertical fragmentary sectional view showing one of the fasteners being inserted in place.

Figure 2 is a fragmentary detailed sectional view after the fastener has been disposed in place and showing the nut thereof being driven against the adjacent shingle.

Figure 3 is a fragmentary detailed sectional view showing the fastener after the portion of the threaded shank has been trimmed off.

Figure 4 is a side elevational view of the fastener without the nut.

Figure 5 is an elevational view showing the nut.

Figure 6 is a side elevational view of the tool for applying the nut.

Figure 7 is an end elevational view of the tool.

Referring to the drawing wherein like numerals designate like parts, it can be seen that numeral 5 denotes a wood sheathing on which asbestos or wooden shingles 6 are being placed.

Numeral 7 generally refers to the improved fastening means which consists of an elongated rod-like member 8, having a sharp-pointed front end 11, said member being threaded as at 9, rearwardly of substantially its transverse center to its rear end. Between the front end 11 and the threads 9, said member 8 is slit, as at 8', along opposite sides thereof to provide a pair of diametrically opposite, resilient legs 10, 10 which are bent to curve and flare rearwardly, relatively.

A tapered nut 12 having a cross kerf 13 is provided for co-action with the threads 9 to be fed forwardly on the member 8. The member 8 is designed to be inserted, front end 11 foremost, through aligned tapered apertures 6a, 6b in a pair of overlapping shingles 6, and driven through the sheathing 5, the legs 10 being forced into the slits 8' during the driving and flattening out, as shown in Figure 1, to spring outwardly when said legs have passed clear through the sheathing 5 so that said legs, as shown in Figure 2, will abut the sheathing 5 and prevent retraction of the member out of the sheathing.

The nut 12 is designed to be driven forwardly on the threads 9 into the apertures 6a, 6b in which it is designed to fit, and forced into contact with the sheathing 5, all by applying a tool generally referred to by the numeral 14.

The tool 14 comprises a tubular member 15 provided at one end with a pair of aligned radial cross ribs 16 adapted to fit the kerf 13, the other end of the member being provided with laterally disposed finger grip wings 17.

The nut 12 is driven, in contact with the sheathing 5, until the member 8 is retracted sufficiently to abut the free ends of the legs 10 against the opposite side of the sheathing, in which position of said legs, the shingles 6 are clamped in place and the legs 10 will bend under expansion and contraction of the shingles to compensate for such expansion and contraction.

After the nut 12 has been driven to the position shown in Figure 2, the surplus or protruding portion of the elongated element 8 may be snipped off. However, this portion may be used under certain requirements for hanging various articles.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fastener for yieldingly clamping a shingle having a tapered aperture therein to one side of sheathing comprising a rod-like member having a pointed front end whereby the member is adapted for driving through the aperture and sheathing, said member intermediate its ends being longitudinally slit along opposite sides to provide a pair of diametrically opposite rearwardly flaring side legs thereon adapted to be engaged with the other side of the sheathing by retraction of the member after the same has been driven through the aperture and sheathing until said legs clear said other side of the sheathing, and a nut threaded onto said member in the rear of said legs and adapted to be fed forwardly on the member into said aperture and against said one side of the sheathing to thereby retract said member, said legs being resilient to fold into said slits during passage of the legs through the aperture and sheathing and for retraction to spring out of the slits into flaring relation after the same have passed through said aperture and sheathing, said nut being kerfed for feeding by a tool inserted in the kerf and tapered to fit said aperture in the shingle.

BERNHARD A. GADOW.